(12) United States Patent
Martin

(10) Patent No.: US 11,898,126 B2
(45) Date of Patent: Feb. 13, 2024

(54) SYSTEM AND METHOD FOR EXTRACTION OF SOLUBLE FLAVORING COMPONENTS FROM A SOLID FLAVOR CARRIER MATERIAL INTO A BREWING LIQUID

(71) Applicant: ALFA LAVAL CORPORATE AB, Lund (SE)

(72) Inventor: Denis Martin, Rødovre (DK)

(73) Assignee: ALFA LAVAL CORPORATE AB, Lund (SE)

(*) Notice: Subject to any disclaimer, the term of this patent is extended or adjusted under 35 U.S.C. 154(b) by 1003 days.

(21) Appl. No.: 16/632,107

(22) PCT Filed: Jun. 12, 2018

(86) PCT No.: PCT/EP2018/065433
§ 371 (c)(1),
(2) Date: Jan. 17, 2020

(87) PCT Pub. No.: WO2019/015879
PCT Pub. Date: Jan. 24, 2019

(65) Prior Publication Data
US 2020/0165549 A1    May 28, 2020

(30) Foreign Application Priority Data

Jul. 21, 2017  (EP) .................................. 17182529

(51) Int. Cl.
*C12C 3/08*     (2006.01)
*C12C 5/02*     (2006.01)
(Continued)

(52) U.S. Cl.
CPC .............. *C12C 3/085* (2013.01); *C12C 5/026* (2013.01); *C12C 11/006* (2013.01); *C12C 13/00* (2013.01)

(58) Field of Classification Search
CPC ......... C12C 13/00; C12C 5/026; C12C 3/085; C12C 5/00; C12C 11/006
See application file for complete search history.

(56) References Cited

U.S. PATENT DOCUMENTS

| 3,102,813 A | 9/1963 | Teignmouth et al. |
| 4,844,932 A * | 7/1989 | Daoud .................... C12C 7/16 |
| | | 210/651 |

(Continued)

FOREIGN PATENT DOCUMENTS

| CN | 87107046 A | 6/1988 |
| CN | 104740892 A | 7/2015 |

(Continued)

OTHER PUBLICATIONS

An English Translation of the Office Action (Notice of Reasons for Rejection) dated Feb. 22, 2021, by the Japanese Patent Office in corresponding Japanese Patent Application No. 2020-502684. (4 pages).

(Continued)

*Primary Examiner* — Dana Ross
*Assistant Examiner* — Kuangyue Chen
(74) *Attorney, Agent, or Firm* — BUCHANAN INGERSOLL & ROONEY PC

(57) ABSTRACT

Disclosed is a system and method for extraction of soluble flavoring components from a solid flavor carrier material into a brewing liquid. The system comprises a process vessel and a filtration device. The process vessel comprises an inlet for solid flavor carrier material, a circulation inlet for material comprising brewing liquid and a circulation outlet for material comprising brewing liquid. The filtration device is arranged for separation of solid components from material comprising brewing liquid and is a cross-flow filtration device comprising at least one cross-flow filter, a circulation inlet for material comprising brewing liquid, a circulation (Continued)

outlet for unfiltered material comprising brewing liquid and a closable outlet for filtered material comprising brewing liquid. The process vessel and the filtration device are comprised in a recirculation loop. Furthermore, the system comprises a recirculation pump and a closable feed inlet for introduction of material comprising brewing liquid into the recirculation loop.

17 Claims, 4 Drawing Sheets

(51) Int. Cl.
    *C12C 11/00*      (2006.01)
    *C12C 13/00*      (2006.01)

(56) References Cited

U.S. PATENT DOCUMENTS

| | | | | |
|---|---|---|---|---|
| 4,975,297 | A * | 12/1990 | Gresch | A23L 2/74 210/615 |
| 5,090,306 | A | 2/1992 | Gresch | |
| 5,262,053 | A * | 11/1993 | Meier | B01D 65/08 210/639 |
| 7,273,554 | B2 | 9/2007 | Rodenberg et al. | |
| 8,875,616 | B2 | 11/2014 | Roth | |
| 9,303,241 | B2 | 4/2016 | Reeves | |
| 9,493,732 | B2 | 11/2016 | Banke et al. | |
| 2016/0145550 | A1 | 5/2016 | Bahns et al. | |
| 2020/0165549 | A1* | 5/2020 | Martin | C12C 13/00 |
| 2022/0186161 | A1* | 6/2022 | Toombs | C12C 7/28 |

FOREIGN PATENT DOCUMENTS

| | | | | |
|---|---|---|---|---|
| DE | 102010054720 | A1 | | 6/2012 |
| DE | 102012212796 | A1 | | 1/2014 |
| DE | 102013101435 | A1 * | 8/2014 | C12C 13/00 |
| DE | 102013101435 | A1 | | 8/2014 |
| DE | 102013004562 | A1 | | 9/2014 |
| DE | 102013022271 | A1 | | 9/2014 |
| DE | 102015101518 | B3 | | 2/2016 |
| DE | 10 2015 121 999 | A1 | | 6/2016 |
| DE | 102015103909 | A1 | | 9/2016 |
| DE | 102016101626 | A1 | | 10/2016 |
| DE | 102015111009 | A1 | | 1/2017 |
| DE | 102015112270 | A1 | | 2/2017 |
| EP | 0208450 | A2 | | 1/1987 |
| EP | 0 265 152 | A2 | | 4/1988 |
| GB | 2531054 | A | | 4/2016 |
| JP | S62-213817 | A | | 9/1987 |
| JP | S63-185365 | A | | 7/1988 |
| JP | H02-150263 | A | | 6/1990 |
| WO | 0228994 | A1 | | 4/2002 |
| WO | 2004007059 | A1 | | 1/2004 |
| WO | 2009/054495 | A1 | | 4/2009 |

OTHER PUBLICATIONS

Fillaudeau et al., "Investigation of Rotating and Vibrating Filtration for Clarification of Rough Beer," Journal of Food Engineering, (Dec. 31, 2007), vol. 80, pp. 206-217.

Wenlong, "Research on Membrane Flux and its Influencing Factors of Cross-Flow Membrane Filtration System," Beer Science and Technology, (Jan. 10, 2013), vol. 1, pp. 28-34.

Yadong, "China Light Industry Press," Beer Production Technology, (Feb. 28, 2013), First Edition, pp. 247-250.

Office Action (Text of First Office Action) dated Aug. 1, 2022, by the State Intellectual Property Office of People's Republic of China in corresponding Chinese Patent Application No. 201880048771.4 and an English Translation of the Office Action. (10 pages).

International Search Report (PCT/ISA/210) dated Aug. 28, 2018, by the European Patent Office as the International Searching Authority for International Application No. PCT/EP2018/065433.

Written Opinion (PCT/ISA/237) dated Aug. 28, 2018, by the European Patent Office as the International Searching Authority for International Application No. PCT/EP2018/065433.

Beer filtration, Bilek Filtry, 24 pages, publication date unknown but copy obtained on Feb. 10, 2017.

Pentair Crossflow, downloaded from internet: www.advancedfiltration. pentair.com/en/products/crossflow-mbr, 1 page, publication date unknown, downloaded from the internet on Feb. 10, 2017.

\* cited by examiner

SYSTEM AND METHOD FOR EXTRACTION OF SOLUBLE FLAVORING COMPONENTS FROM A SOLID FLAVOR CARRIER MATERIAL INTO A BREWING LIQUID

TECHNICAL FIELD

The present invention relates to a system for extraction of soluble flavoring components from a solid flavor carrier material, such as a solid hop material, into a brewing liquid, such as wort or beer. In addition, the present invention relates to a method for extraction of soluble flavoring components from a solid flavor carrier material, such as a solid hop material, into a brewing liquid, such as wort or beer.

BACKGROUND OF THE INVENTION

During the process for brewing beer, flavor affecting components are usually added to the brewing liquid at one or more stages of the brewing process. For example, soluble hop components affecting the flavor of the brewing liquid by imparting a bitter taste and aroma to the brewing liquid may be added to the brewing liquid by a process involving addition of a hop material to the brewing liquid.

During the hop addition process, a hop material is added to the brewing liquid and soluble hop components are extracted from the hop material into the brewing liquid. The hop addition may be performed at any stage of the brewing process. For example, hop addition may be applied to brewing liquid in the form of wort or beer.

In case of hop addition to wort, the hop addition is usually performed during the wort boiling. However, the hop addition to wort may also be performed during the whirlpool stage before the wort cooler stage.

In case of hop addition to beer, the hop addition process is sometimes denoted as "dry hopping". The hop addition is then performed during the cold stages of the brewing process, for example during and/or after fermentation, preferably after fermentation. Thus, the hop addition to beer may be performed during and/or after maturation.

The hop material used for the hop addition process may be added to the wort or beer in the form of, for example, a solid hop material such as hop pellets. However, the use of a solid hop material implies that solid hop residues remain in the wort or beer after the extraction of soluble hop components from the solid hop material in the hop addition process. These solid hop residues need to be removed since they are unwanted in the subsequent processing stages of the wort or beer and also in the final beer product.

There are a lot of different systems and methods known today for performing the extraction of soluble hop components from solid hop materials into a brewing liquid and for removing solid hop residues from the brewing liquid after the extraction of soluble hop components.

DE 10 2013 101 435 describes a device and method for extracting aroma substances from vegetable aroma carriers into a brewing liquid. In this device and method, soluble aroma substances are extracted into a brewing liquid and thereafter the solid hop components in the form of solid hop residues are removed from the brewing liquid. The removal is performed by separation of the brewing liquid containing solid hop residues into a liquid phase and a solid phase. A hydrocyclone or a filter is utilized for the separation. However, use of a hydrocyclone is associated with a considerable investment cost and with challenges with adjustment of the capacity thereof to the required capacity of the brewing process. Use of a filter for separation into a liquid phase and a solid phase is associated with a risk of clogging of the filter.

Accordingly, there is still room for improvements of systems and methods for extraction of soluble flavoring components from a solid flavor carrier material into a brewing liquid.

SUMMARY OF THE INVENTION

One object of the present invention is to provide an improved system for extraction of soluble flavoring components from a solid flavor carrier material into a brewing liquid, which system alleviates at least some of the above-mentioned disadvantages with known devices for separation of solid components from the brewing liquid, and which system is associated with a facilitated extraction of soluble flavoring components from the solid flavor carrier material into the brewing liquid.

As a first aspect of the invention, there is provided a system for extraction of soluble flavoring components from a solid flavor carrier material into a brewing liquid, wherein the system comprises:

- a process vessel arranged to receive solid flavor carrier material and to receive and discharge material comprising brewing liquid, wherein said process vessel comprises an inlet for solid flavor carrier material, a circulation inlet for material comprising brewing liquid and a circulation outlet for material comprising brewing liquid, and
- a filtration device for separation of solid components from material comprising brewing liquid, wherein said filtration device is a cross-flow filtration device comprising at least one cross-flow filter within the cross-flow filtration device, a circulation inlet for material comprising brewing liquid, a circulation outlet for unfiltered material comprising brewing liquid and a closable outlet for filtered material comprising brewing liquid;

wherein the process vessel and the filtration device are comprised in a recirculation loop for circulation of material comprising brewing liquid, wherein the circulation outlet of the process vessel is connected to the circulation inlet of the filtration device in the recirculation loop, wherein the circulation outlet of the filtration device is connected to the circulation inlet of the process vessel in the recirculation loop, wherein the system further comprises a recirculation pump for generating a flow of material comprising brewing liquid in the recirculation loop, wherein the recirculation loop further comprises a closable feed inlet for introduction of material comprising brewing liquid into the recirculation loop, said feed inlet being connected to the circulation inlet of the process vessel, and wherein the recirculation loop optionally further comprises a closable drain outlet.

The system of the first aspect of the invention is advantageous in that it is based on a cross-flow process, i.e. it comprises a cross-flow filter device, for separation of solid components from material comprising brewing liquid after extraction of soluble flavoring components from a solid flavor carrier material into the brewing liquid. Thus, the whole system may be regarded as a cross-flow system. Since the system comprises a filtration device in the form of a cross-flow filtration device for the separation, clogging of the filter, i.e. the cross-flow filter of the cross-flow filtration device, may be avoided or essentially reduced by regulating the flow of material comprising brewing liquid through the cross-flow filtration device, i.e. by regulating the recirculation flow of material comprising brewing liquid in the recirculation loop together with regulating the flow of material comprising brewing liquid entering and exiting the recirculation loop, such that the flow of material comprising brewing liquid parallel with the surface of the cross-flow filter is regulated.

The system of the first aspect of the invention is also advantageous in that extraction of soluble flavoring components from the solid flavor carrier material into brewing liquid in the process vessel and the remainder of the recirculation loop is facilitated. This is due to the fact that the system is arranged for recirculation of material comprising brewing liquid in the recirculation loop during use, which implies that a high agitation and turbulence is achieved in the recirculation loop, thus facilitating the extraction.

The system is arranged for extraction of soluble flavoring components from a solid flavor carrier material into a brewing liquid, which may be comprised in a brewing liquid material (i.e. a material comprising brewing liquid). Brewing liquid refers to any kind of liquid which is involved/used in a brewing process. Thus, the brewing liquid may be any fermentable of fermented brewing liquid, such as any brewing liquid before or after fermentation. For example, the brewing liquid may be a liquid such as beer or wort. The beer may be beer that is still fermenting, beer that is fermented, beer that is to be matured, beer that is still maturing, beer that is matured or beer that is fermented and matured. The brewing liquid may also be a suitable cleaning liquid for recovery of another brewing liquid and/or for cleaning and recovery of the solid flavor carrier material comprised in the recirculation loop, such as brewing water. For example, the brewing water may be deaerated water.

Brewing liquid material, i.e. material comprising brewing liquid, refers to any kind of liquid material comprising a brewing liquid. Thus, the brewing liquid material may be a brewing liquid or a liquid material comprising a brewing liquid and solids/solid components/particles, i.e. a slurry/suspension. The brewing liquid material may also comprise more than one brewing liquid, i.e. two or more different brewing liquids. For example, the brewing liquid material may be beer or wort or a slurry/suspension comprising beer or wort and solids/solid components/particles.

The solid flavor carrier material may be any solid material that is insoluble but comprises soluble flavoring components, which may be extracted into the brewing liquid, which are suitable for extraction into the brewing liquid and which affect the flavor (i.e. aroma and/or taste) of the brewing liquid. For example, the solid flavor carrier material may comprise or be constituted by a solid hop material, such as whole hops, hop pellets, hops in powder form or any form of upconcentrated hop products in solid form. Alternatively, the solid flavor carrier material may comprise or be constituted by one or more adjuncts. For example, the one or more adjuncts may be selected from coffee, orange peel, cocoa nibs/material and wood chips. The solid flavor carrier material may also comprise both a hop material and one or more adjuncts.

In accordance with the above, the process vessel is arranged to receive solid flavor carrier material and receive and discharge material comprising brewing liquid and comprises an inlet for solid flavor carrier material, a circulation inlet for material comprising brewing liquid and a circulation outlet for material comprising brewing liquid. Thus, the process vessel is arranged to receive solid flavor carrier material through the inlet for solid flavor carrier material, to receive material comprising brewing liquid via the circulation inlet and to discharge material comprising brewing liquid via the circulation outlet. Accordingly, the process vessel is arranged to, at least temporarily, accommodate solid flavor carrier material. The circulation inlet and the circulation outlet of the process vessel may be arranged such that material comprising brewing liquid fed (i.e. pumped) from the circulation inlet to the circulation outlet, i.e. received via the circulation inlet and fed towards the circulation outlet, is fed through solid flavor carrier material when accommodated in the process vessel.

The material comprising brewing liquid fed from the process vessel via the circulation outlet may, depending on the stage of the process, contain dissolved flavoring components of the solid flavor carrier material in the brewing liquid as well as solid components, i.e. non-soluble components/particles, of the solid flavor carrier material provided in the process vessel. The material comprising brewing liquid fed into the process vessel via the circulation inlet may also, depending on the stage of the process, contain dissolved flavoring components of the solid flavor carrier material in the brewing liquid as well as solid components, i.e. non-soluble components/particles, of the solid flavor carrier material provided in the process vessel. This will be further explained below.

The filtration device is arranged for separation of solid components, i.e. unsolved components/particles, from the material comprising brewing liquid, i.e. for filtering material comprising brewing liquid.

In accordance with the above, the filtration device is a cross-flow filtration device comprising at least one cross-flow filter within the cross-flow filtration device. Furthermore, the cross-flow filtration device comprises further a circulation inlet for material comprising brewing liquid, a circulation outlet for unfiltered material comprising brewing liquid and a closable outlet for filtered material comprising brewing liquid. Thus, the cross-flow filtration device is arranged to receive material comprising brewing liquid via the circulation inlet and to discharge unfiltered material comprising brewing liquid through the circulation outlet and filtered material comprising brewing liquid through the closable outlet. Thus, material comprising brewing liquid received in the cross-flow filtration device may be filtered therein when the closable outlet is open such that solid components/particles are separated from the material comprising brewing liquid, i.e. such that filtered material comprising brewing liquid (having no or at least a reduced concentration of solids) is discharged via the outlet for filtered material comprising brewing liquid and unfiltered material comprising brewing liquid (having an increased concentration of solids) is discharged via the circulation outlet (and thereby kept in recirculation/movement in the recirculation loop).

A cross-flow filtration device refers to a filter device comprising a cross-flow filter, in which filter device the main flow of the liquid to be filtered is guided along the filter instead of through it and, due to a pressure difference applied over both sides of the filter, a part of the liquid guided along the filter will nevertheless penetrate through the filter and can be drained as permeate (i.e. filtered liquid). The remaining part of the liquid, i.e. the unfiltered liquid, will again be mixed with liquid to be filtered and is guided repeatedly over the filter.

Thus, the cross-flow filtration device of the system of the first aspect is arranged such that the flow of material comprising brewing liquid to be filtered, i.e. introduced into the cross-flow filtration device via the circulation inlet, is guided along the cross-flow filter. A pressure difference is applied over both sides of the cross-flow filter such that a part of material comprising brewing liquid guided along the cross-flow filter will penetrate through the cross-flow filter. Furthermore, the circulation outlet is arranged such that material comprising brewing liquid not having passed the cross-flow filter (i.e. unfiltered material comprising brewing liquid) is discharged through the circulation outlet. The outlet for filtered material comprising brewing liquid is arranged such that material comprising brewing liquid having passed the cross-flow filter is discharged via the outlet for filtered material comprising brewing liquid.

In accordance with the above, the process vessel and the filtration device of the system of the first aspect are comprised in a recirculation loop for circulation of material comprising brewing liquid. Since the filtration device is a cross-flow filtration device, the recirculation loop may also be denoted as a cross-flow loop. The circulation outlet of the process vessel is connected to the circulation inlet of the filtration device in the recirculation loop, e.g. via a first circulation conduit. The circulation outlet of the filtration device is connected to the circulation inlet of the process vessel in the recirculation loop, e.g. via a second circulation conduit.

Furthermore, in accordance with the above the system comprises further a recirculation pump for generating a flow of material comprising brewing liquid in the recirculation loop. The recirculation pump may be positioned at any suitable position in the recirculation loop, such as between the circulation outlet of the filtration device and the circulation inlet of the process vessel. The recirculation pump may be any suitable pump for pumping material comprising brewing liquid in the recirculation loop. For example, the recirculation pump may be a positive displacement pump such as a lobe pump in order to enable pumping of material containing a high concentration of solids.

In addition, in accordance with the above the recirculation loop comprises further a closable feed inlet for introduction of material comprising brewing liquid into the recirculation loop, typically for introduction of material comprising brewing liquid not previously treated in the system to which the feed inlet belongs. The feed inlet is connected to the circulation inlet of the process vessel. Thus, the feed inlet may, for example, be connected to a second circulation conduit connecting the circulation outlet of the filtration device with the circulation inlet of the process vessel in the recirculation loop. Then, material comprising brewing liquid may be fed into the recirculation loop, i.e. into the second circulation conduit, via the feed inlet and be fed together with unfiltered material comprising brewing liquid discharged through the circulation outlet of the filtration device to the process vessel via the circulation inlet thereof when the outlet for filtered material comprising brewing liquid is open. The feed inlet may also be used for introducing material comprising brewing liquid into the recirculation loop in order to fill up the recirculation loop with material comprising brewing liquid when the outlet for filtered material comprising brewing liquid is closed.

The cross-flow filter device of the system of the first aspect may be any suitable cross-flow filter device having the above defined features.

In embodiments of the system of the first aspect, the cross-flow filtration device is a filtrate-in-to-out filtration device, wherein the filtration device comprises an inner compartment arranged to receive material comprising brewing liquid via the circulation inlet of the filtration device and to discharge unfiltered material comprising brewing liquid via the circulation outlet of the filtration device, wherein the filtration device comprises an outer compartment arranged to receive filtered material comprising brewing liquid (i.e. material comprising brewing liquid having passed the cross-flow filter(s)) and to discharge filtered material comprising brewing liquid via the outlet for filtered material comprising brewing liquid, wherein each cross-flow filter comprised in the filtration device has an inner surface and an outer surface, and wherein the inner surface of each cross-flow filter is arranged in contact with said inner compartment and wherein the outer surface of each cross-flow filter is arranged in contact with said outer compartment. Accordingly, the inner compartment, the outer compartment and the cross-flow filter(s) are arranged such that material comprising brewing liquid received in the inner compartment need to pass through the cross-flow filter(s) in order to reach the outer compartment and thus the outlet for filtered material comprising brewing liquid.

During use of these embodiments comprising said filtrate-in-to-out filtration device, with the outlet for filtered material comprising brewing liquid open, material comprising brewing liquid received in the inner compartment via the circulation inlet is guided in the inner compartment towards the circulation outlet along the inner surface of the cross-flow filter(s). Due to a pressure difference applied between the inner and outer surface of the cross-flow filter(s), a part of the material comprising brewing liquid guided along the inner surface of the cross-flow filter(s) will penetrate through the cross-flow filter(s) towards the outer compartment and is discharged as permeate, i.e. filtered material comprising brewing liquid, via the outlet for filtered material comprising brewing liquid. Material comprising brewing liquid not filtrated through the cross-flow filter(s) is then discharged from the inner compartment via the circulation outlet (and thereby kept in recirculation/movement in the recirculation loop).

Use of a filtrate-in-to-out filtration device is advantageous since it may be integrated in a good way in the recirculation loop and since it implies that it is easier to avoid any dead zones or preferential channels in the filter(s).

In embodiments comprising said filtrate-in-to-out filtration device, at least one of said at least one cross-flow filter is a cylindrical cross-flow filter, wherein each cylindrical cross-flow filter surrounds a channel being part of said inner compartment. The circulation inlet of the filtration device may then be connected to the cylindrical channel(s) at one end thereof and the circulation outlet of the filtration device may then be connected to the cylindrical channel(s) at the other end thereof.

In embodiments comprising said filtrate-in-to-out filtration device, at least one of said at least one cross-flow filter is a wedge wire filter.

A wedge wire filter refers to a filter comprising wedge wires, i.e. wedge-shaped or V-shaped wires. Typically, the wedge-shaped wires constitute surface profiles that are welded onto a support profile. The distance between the wedge wires or surface profiles forms a slot through which the filtrate flows, i.e. a filter opening through which material is filtrated.

It is advantageous to utilize a wedge wire filter since the shape of the wires contributes to minimization of clogging. Also, a low pressure drop may be achieved between the surfaces of the filter.

In embodiments of the system of the first aspect wherein at least one of said at least one cross-flow filter is a wedge wire filter, the wedge wire filter comprises wedge wires arranged parallel with a flow direction of material comprising brewing liquid through the inner compartment from the circulation inlet to the circulation outlet, which wedge wires comprise planar portions (i.e. flat parts) forming said inner surface. Consequently, tip portions (i.e. tip parts) of the wedge wires may then form said outer surface. Since the planar portions of the wedge wires form the inner surface, a smooth filtration surface is provided.

Thus, the system of the first aspect may comprise one cross-flow filter. The inner compartment may then be a cylindrical channel surrounded by the cross-flow filter. The circulation inlet of the filtration device may then be connected to the cylindrical channel at one end thereof and the circulation outlet of the filtration device may then be connected to the cylindrical channel at the other end thereof. The cross-flow filtration device may then be a wedge-wire based filter, which comprises wedge wires arranged parallel with a flow direction of brewing liquid material through the inner compartment from the circulation inlet to the circulation outlet, which wedge wires comprise planar portions forming said inner surface.

In embodiments of the system in which the cross-flow filtration device comprises two or more cross-flow filters, the cross-flow filters may be arranged in series or in parallel in the cross-flow filtration device.

In embodiments of the system of the first aspect, the cross-flow filter comprises filter openings having a size of ≤200 μm, such as a size in the range of 50 μm to 200 μm. For a wedge wire filter, the size of the filter openings refers to the smallest distance between two parallel wedge wires at the inner surface of the wedge wire filter.

In embodiments of the system of the first aspect, the circulation inlet of the process vessel is arranged such that a tangential flow of material comprising brewing liquid is introduced into the process vessel when material comprising brewing liquid is pumped in the recirculation loop by means of the recirculation pump. In these embodiments, a vortex flow may be achieved in the process vessel when material comprising brewing liquid introduced into the process vessel passes through solid flavor carrier material accommodated in the process vessel towards the circulation outlet of the process vessel. The extraction of soluble flavoring components from solid flavoring material accommodated in the process vessel may thereby be facilitated.

In embodiments of the system of the first aspect, the recirculation loop comprises the optional closable drain outlet. For example, the closable drain outlet may be positioned between the circulation outlet of the filtration device and the circulation inlet of the process vessel. The drain outlet may be arranged for drainage of a material comprising brewing liquid from the recirculation loop.

In embodiments of the system of the first aspect, the system comprises further one or more of the following: one or more storage vessels, a feed pump for feeding material comprising brewing liquid into the recirculation loop, and an arrangement for introduction of $CO_2$ into the recirculation loop and discharge of $CO_2$ from the recirculation loop.

The system may comprise a storage vessel arranged to, at least temporarily, store material comprising brewing liquid to be treated in the system and/or a storage vessel arranged to, at least temporarily, store material comprising brewing liquid that has been treated in the system (i.e. filtered material comprising brewing liquid discharged through the outlet for filtered material comprising brewing liquid of the filtration device).

The arrangement for introduction and discharge of $CO_2$ may comprise a $CO_2$ source, a $CO_2$ supply conduit connected to the recirculation loop and a $CO_2$ discharge conduit connected to the recirculation loop. For example, the $CO_2$ supply conduit and the $CO_2$ discharge conduit may connected to the process vessel. The arrangement for introduction and discharge of $CO_2$ into the recirculation loop may be utilized for making the recirculation loop oxygen free by means of $CO_2$ purging before introduction of brewing liquid material into the recirculation loop.

As a second aspect of the invention, there is provided a brewery arrangement comprising a system according to any embodiment of the first aspect of the invention discussed above and at least one device selected from the group of a whirlpool, a wort cooler and a fermentation tank.

In embodiments of the brewery arrangement of the second aspect, the brewery arrangement comprises a whirlpool, wherein the system is positioned upstream said whirlpool. Thus, in these embodiments the system may be utilized for extracting soluble flavor components form solid flavor carrier material into brewing liquid in the form of wort.

In embodiments of the brewery arrangement of the second aspect, the brewery arrangement comprises a whirlpool and a wort cooler, wherein the system is positioned between the whirlpool and the wort cooler, e.g. between a wort boiler and the whirlpool. Thus, in these embodiments the system may be utilized for extracting soluble flavor components form solid flavor carrier material into brewing liquid in the form of wort.

In embodiments of the brewery arrangement, the brewery arrangement comprises a fermentation tank, wherein the system is positioned downstream the fermentation tank or is positioned in a recirculation loop having an inlet and an outlet connected to the fermentation tank.

Another object of the present invention is to provide an improved method for extraction of soluble flavoring components from a solid flavor carrier material into a brewing liquid, which method alleviates at least some of the above-mentioned disadvantages with known methods for separation of solid components from the brewing liquid and which method is associated with a facilitated extraction of soluble flavoring components into the brewing liquid.

As a third aspect of the invention, there is provided a method for extraction of soluble flavoring components from a solid flavor carrier material into a brewing liquid, the method comprising:
 a) providing a system according to any embodiment of the first aspect of the invention as discussed above;
 b) introducing solid flavor carrier material into said process vessel via said inlet for solid flavor carrier material;
 c) introducing material comprising brewing liquid into the recirculation loop via the feed inlet, with the outlet for filtered material comprising brewing liquid of the filtration device and the optional drain outlet closed, so as to fill up the recirculation loop with material comprising brewing liquid;
 d) circulating material comprising brewing liquid in the recirculation loop, with the feed inlet, the outlet for filtered material comprising brewing liquid of the filtration device and the optional drain outlet closed, so as to disaggregate the solid flavor carrier material and provide the circulating material comprising brewing liquid with solid components of the solid flavor carrier material, and
 e) after disaggregation of the solid flavor carrier material, opening the feed inlet and the outlet for filtered material comprising brewing liquid of the filtration device, feeding material comprising brewing liquid into the recirculation loop via the feed inlet, and circulating material comprising brewing liquid in the recirculation loop.

The terms and definitions used in relation to the third aspect are as discussed under the first aspect above.

The method of the third aspect of the invention is advantageous since it is based on a cross-flow process involving use of a cross-flow filtration device for separation of solid components from the material comprising brewing liquid after extraction of soluble flavoring components from a solid flavor carrier material into the brewing liquid. Thereby, clogging of the filter, i.e. the cross-flow filter, of the filtration device may be avoided or essentially reduced by regulating the recirculation flow of material comprising brewing liquid in the recirculation loop together with regulating the flow of material comprising brewing liquid entering and exiting the recirculation loop, such that the flow of material comprising brewing liquid parallel with the surface of the cross-flow filter is regulated.

The method of the third aspect of the invention is also advantageous in that extraction of soluble flavoring components from the solid flavor carrier material in the process vessel and the remainder of the recirculation loop is facilitated. This is due to the fact that the method involves circulation of material comprising brewing liquid in the recirculation loop, which implies that a high agitation and turbulence is achieved in the recirculation loop, thus facilitating the extraction.

Step b) of the method thus involves introducing solid flavor carrier material into the process vessel via the inlet for solid flavor carrier material. Accordingly, after step b) is finished solid flavor carrier material is accommodated in the process vessel.

Step c) of the method thus involves introducing material comprising brewing liquid into the recirculation loop via the feed inlet of the recirculation loop with the outlet for filtered material comprising brewing liquid of the filtration device closed and the drain outlet of the recirculation loop (if present in the recirculation loop of the provided system) closed, so as to fill up the recirculation loop with material comprising brewing liquid. Accordingly, after step c) is finished the recirculation loop is filled up with material comprising brewing liquid into which soluble flavoring components are to be extracted from the solid flavor carrier material accommodated in the process vessel. For example, the material comprising brewing liquid may be introduced into the recirculation loop from a storage vessel. A feed pump may be utilized for the introduction of material comprising brewing liquid into the recirculation loop.

Step d) of the method thus involves circulating the introduced material comprising brewing liquid in the recirculation loop, with the feed inlet, the outlet for filtered material comprising brewing liquid of the filtration device and the drain outlet (if present in the recirculation loop of the provided system) closed, so as to disaggregate the solid flavor carrier material in the process vessel and provide the circulating material with solid components/particles of the solid flavor carrier material. Thus, after step c) is finished, i.e. when the recirculation loop is filled up with material comprising brewing liquid, the feed inlet is closed. Thereafter the circulation of the introduced material comprising brewing liquid in the recirculation loop may be started. The circulation is performed by means of the recirculation pump. The circulation is performed so as to obtain disaggregation of solid flavor carrier material in the process vessel and thus facilitate extraction of soluble flavoring components from the solid flavor carrier material. During the circulation, soluble flavoring components of the solid flavor carrier material will be extracted into the brewing liquid and insoluble solid components of the solid flavor carrier material will also be included in the material comprising brewing liquid.

The aim of the disaggregation of step d) may be to obtain a certain size of the disaggregated solid components of the solid flavor carrier material. For example, the degree of disaggregation may be monitored by visual inspection/analysis, by turbidity measurements or by utilizing the power consumption of the recirculation pump as an indication of the degree of disaggregation (i.e. as an indication of the viscosity of the circulated material comprising brewing liquid).

After finished disaggregation of the solid flavor carrier material, the feed inlet and the outlet for filtered material comprising brewing liquid of the filtration device are opened, material comprising brewing liquid is fed into the recirculation loop via the feed inlet and material comprising brewing liquid is circulated in the recirculation loop in accordance with step e). The circulation of material comprising brewing liquid in the recirculation loop is performed by means of the recirculation pump and the introduction of material comprising brewing liquid into the recirculation loop may be performed by a feed pump.

Accordingly, during performance of step e) untreated material comprising brewing liquid is fed into the recirculation loop via the feed inlet and further to the circulation inlet of the process vessel since the feed inlet is connected to the circulation inlet of the process vessel. In addition, material comprising brewing liquid discharged from the filtration device, i.e. unfiltered material comprising brewing liquid, is fed to the circulation inlet of the process vessel. The unfiltered material comprising brewing liquid discharged from the filtration device may be added to the material comprising brewing liquid introduced into the recirculation loop via the feed inlet before introduction into the process vessel. Thus, the material comprising brewing liquid introduced into the process vessel comprises both material comprising brewing liquid introduced into the recirculation loop via the feed inlet and unfiltered material comprising brewing liquid discharged from the filtration device.

Furthermore, during circulation of brewing liquid material in the recirculation loop of step e), soluble flavoring components of the solid flavor carrier material will be extracted into the brewing liquid and insoluble solid components of the solid flavor carrier material will also be included in the brewing liquid material.

In addition, during circulation of material comprising brewing liquid in the recirculation loop of step e), the material comprising brewing liquid introduced into the cross-flow filtration device via the circulation inlet is guided along the cross-flow filter(s) comprised therein. Then, a part of the material comprising brewing liquid is filtered through the cross-flow filter(s), whereby the filtered material comprising brewing liquid discharged via the outlet for filtered material comprising brewing liquid contains no, or an essentially reduced concentration of solid components of the solid flavor carrier material, since solid components are retained by the cross-flow filter(s). The remaining part of the material comprising brewing liquid guided along the cross-flow filter(s), but not penetrated through the cross-flow filter(s), will then comprise a greater concentration of solid components and is discharged from the filtration device via the circulation outlet of the filtration device. The unfiltered material comprising brewing liquid discharged via the circulation outlet is fed again to the circulation inlet of the process vessel, which newly introduced material comprising brewing liquid also is via the feed inlet. The material comprising brewing liquid discharged from the filtration device via the outlet for filtered material comprising brewing liquid may be fed to a storage vessel.

In embodiments of the method of the third aspect, the circulation of step d) is performed at a first flow rate and the circulation of step e) is performed at a second flow rate, wherein the second flow rate is higher than the first flow rate. The increase of the flow rate during step e), i.e. during the filtration, may be performed in order to avoid clogging of the cross-flow filter by solid components/particles of the solid flavor carrier material. For example, a recirculation flow rate resulting in a velocity of at least 0.8 m/s of the flow of material comprising brewing liquid on the inner surface of the cross-flow filter(s) may be required in order to achieve an unclogging effect.

In embodiments of the method of the third aspect, the brewing liquid is beer or wort and the solid flavor carrier material comprises a solid hop material, such as hop pellets.

In embodiments of the method of the third aspect, the optional drain outlet is kept closed during steps b)-e) of the method and the method comprises further the step of:
f) introducing a second material comprising a second brewing liquid into the recirculation loop via the feed inlet and circulating second material in the recirculation loop, with the outlet for filtered material comprising brewing liquid of the filtration device open and the optional drain outlet closed, wherein the second material is different from the material comprising brewing liquid utilized in steps c)-e) of the method.

Step f) of the method thus involves replacement of the previously introduced material comprising brewing liquid with another, second, material. For example, the second brewing liquid may be a suitable cleaning fluid for recovery of brewing liquid still contained in the recirculation loop after steps c)-e) and/or for cleaning and recovery of the solid flavor carrier material comprised in the recirculation loop. The second brewing liquid may be brewing water, such as deaerated water.

In embodiments of the method comprising step f), wherein the recirculation loop of the system provided in step a) of the method comprises the drain outlet and wherein the drain outlet is kept closed during steps b)-f) of the method, the method comprises further a step of:
g) opening the drain outlet and draining material comprising brewing liquid from the recirculation loop via the drain outlet with the outlet for filtered material comprising brewing liquid of the filtration device and the feed inlet closed.

Step g) of the method thus involves draining of material still comprised in the recirculation loop after the cleaning of step f) is finished.

By introducing and circulating second material in the recirculation loop with the outlet for filtered material comprising brewing liquid of the filtration device open and the optional drain outlet closed in accordance with step f), recovery of brewing liquid still contained in the recirculation loop after steps c)-e) may be obtained in a first substep. Recovered first brewing liquid is then discharged together with second brewing liquid via the outlet for filtered material of the filtration device during the first substep.

By draining material still comprised in the recirculation loop after finished cleaning, recovery of cleaned solid flavor carrier material still comprised in the recirculation loop after finished cleaning of step f) may be obtained in a second substep. Cleaned and recovered solid flavor carrier material is then discharged together with other material still comprised in the recirculation loop via the drain outlet during the second substep and may be reused or wasted.

Recovery of the brewing liquid in the first substep and recovery of solid flavour carrier material in the second substep may be regarded as diafiltration steps.

In embodiments of the method of the third aspect, step c) may be preceded by a step of making the recirculation loop oxygen free by means of $CO_2$ purging.

Still other objects and features of the present disclosure will become apparent from the following detailed description considered in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures described herein.

BRIEF DESCRIPTION OF THE DRAWINGS

In the drawings, wherein like reference characters denote similar elements throughout the several views.

DETAILED DESCRIPTION

The system and method according to the present disclosure will be further illustrated by the following description of some embodiments with reference to the accompanying drawings.

Figure 1:
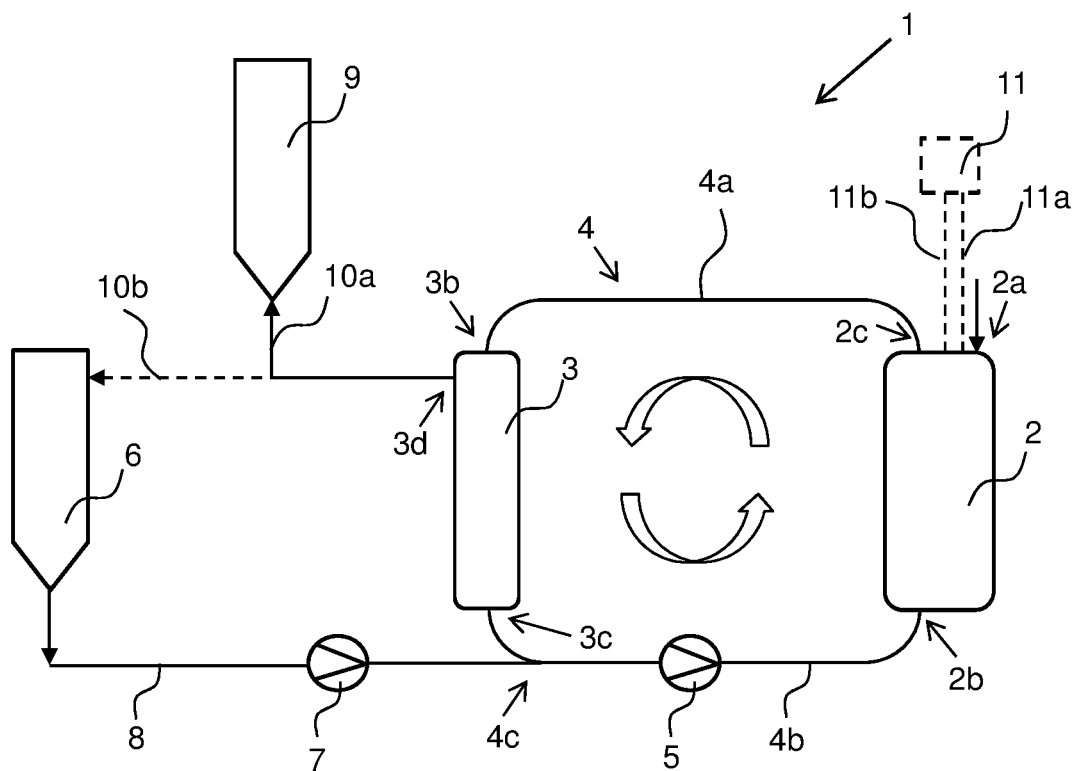
FIG. 1 shows a schematic view of one embodiment of the system for extraction of soluble flavoring components from a solid flavor carrier material into a brewing liquid according to the present disclosure.

FIG. 1 shows a schematic view of one embodiment of a system 1 for extraction of soluble flavoring components from a solid flavor carrier material into a brewing liquid according to the present disclosure. The extraction system 1 of FIG. 1 will in the following be described for application of extraction of soluble flavoring components from solid flavor carrier material in the form of hop pellets into brewing liquid being beer. However, the extraction system 1 may be applied for extraction of soluble flavoring components from any solid flavor carrier material as defined above into any brewing liquid as defined above.

The extraction system 1 comprises a process vessel 2 and a filtration device 3, which are comprised in a recirculation loop 4 for circulation of material comprising beer. The process vessel 2 is arranged to receive and at least temporarily accommodate hop pellets and to receive and discharge material comprising beer.

Thus, the process vessel 2 comprises an inlet 2a for hop pellets, a circulation inlet 2b for material comprising beer and a circulation outlet 2c for material comprising beer. The circulation inlet 2b and the circulation outlet 2c are arranged in relation to each other such that material comprising beer fed from the circulation inlet 2b to the circulation outlet 2c is fed through hop pellets when accommodated in the process vessel 2.

The filtration device 3 is arranged for separation of solid components from material comprising beer and is arranged to receive material comprising beer, to discharge filtered material comprising beer and to discharge unfiltered material comprising beer.

The filtration device 3 is a cross-flow filtration device comprising a cross-flow filter 3a (see FIGS. 2a-b) within the cross-flow filtration device. The filtration device 3 comprises further a circulation inlet 3b for material comprising beer, a circulation outlet 3c for unfiltered material comprising beer and a closeable outlet 3d for filtered material comprising beer. Thus, the closeable outlet 3d may be opened and closed. The embodiment of the cross-flow filtration device 3 included in the extraction system 1 of FIG. 1 is shown in more detail in FIGS. 2a-b and will be further described below.

The circulation outlet 2c of the process vessel 2 is connected to the circulation inlet 3b of the filtration device 3 in the recirculation loop 4 via a first circulation conduit 4a of the recirculation loop 4.

The circulation outlet 3c of the filtration device 3 is connected to the circulation inlet 2b of the process vessel 2 in the recirculation loop 4 via a second circulation conduit 4b of the recirculation loop 4.

The extraction system 1 comprises further a recirculation pump 5 for generating a flow of material comprising beer in the recirculation loop 4. In the embodiment shown in FIG. 1, the recirculation pump 5 is positioned between the circulation outlet 3c of the filtration device 3 and the circulation inlet 2b of the process vessel 2.

The recirculation loop 4 comprises further a closeable feed inlet 4c for introduction of material comprising beer into the recirculation loop 4. Thus, the feed inlet 4c may be opened and closed. The feed inlet 4c is connected to the circulation inlet 2b of the process vessel 2. In the embodiment shown in FIG. 1, the feed inlet 4c is connected to the circulation inlet 2b via the second circulation circuit 4b. Thus, the feed inlet 4c is connected to the second circulation circuit 4b and further with the circulation inlet 2b of the process vessel 2 via the second circulation circuit 4b (and the recirculation pump 5). More specifically, the feed inlet 4c is positioned between the circulation outlet 3c of the filtration device 3 and the recirculation pump 5.

The embodiment of the extraction system 1 shown in FIG. 1 comprises further a first storage vessel 6 arranged to, at least temporarily, store material comprising beer to be treated in the extraction system 1, and a feed pump 7 for feeding material comprising beer from the first storage vessel 6 into the recirculation loop 4 via the feed inlet 4c. The first storage vessel 6 and the feed pump 7 are connected to the feed inlet 4c via a feed conduit 8.

The embodiment of the extraction system 1 shown in FIG. 1 comprises further a second storage vessel 9 arranged to, at least temporarily, store filtered material comprising beer discharged by the filtration device 3 via the outlet 3d for filtered material comprising beer. The outlet 3d is connected to the second storage vessel 9 via a discharge conduit 10a. As shown with dashed lines in FIG. 1, the outlet 3d may alternatively be connected to the first storage vessel 6 via a discharge conduit 10b.

As also shown with dashed lines in FIG. 1, the extraction system 1 may optionally further comprise a $CO_2$ source 11, a $CO_2$ supply conduit 11a connected to the process vessel 2 and a $CO_2$ discharge conduit 11b connected to the process vessel 2.

Figure 2A:
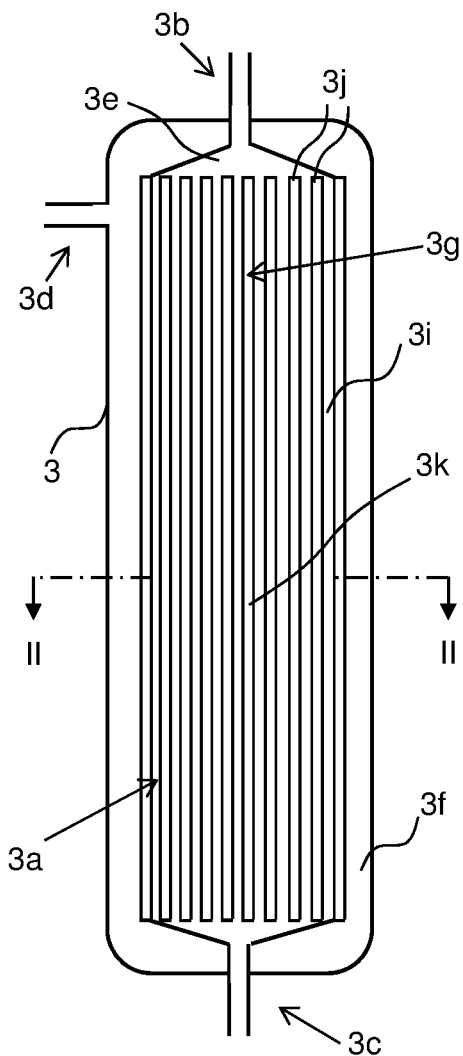
FIG. 2a shows a schematic cross-sectional side view of the filtration device of the system of FIG. 1.
Figure 2B:
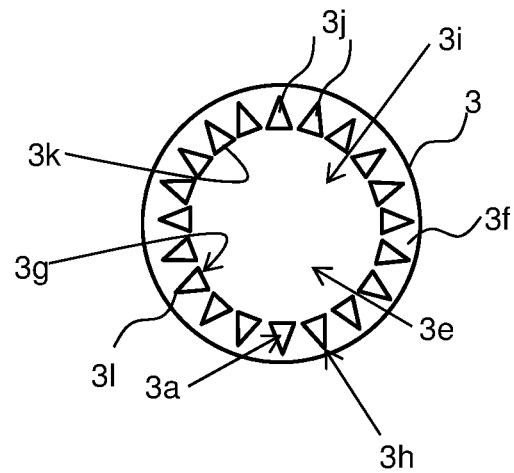
FIG. 2b shows a schematic cross-sectional top view of the filtration device of FIG. 2a according to line II-II.

FIGS. 2a-b show the embodiment of the cross-flow filtration device 3 included in the extraction system 1 of FIG. 1 in more detail, i.e. FIG. 2a shows the filtration device 3 in a schematic cross-sectional side view and FIG. 2b shows a schematic cross-section top view according to line II-II in FIG. 2a. In the embodiment shown in FIGS. 2a-b the cross-flow filtration device 3 is a filtrate-in-to-out filtration device, which comprises an inner compartment 3e arranged to receive material comprising beer via the circulation inlet 3b of the filtration device 3 and to discharge unfiltered material comprising beer via the circulation outlet 3c of the filtration device 3. The filtration device 3 comprises further an outer compartment 3f arranged to receive filtered material comprising beer and to discharge filtered material comprising beer via the outlet 3d for filtered material comprising beer. The cross-flow filter 3a has an inner surface 3g and an outer surface 3h. The inner surface 3g of the cross-flow filter 3a is arranged in contact with the inner compartment 3e and the outer surface 3h is arranged in contact with the outer compartment 3f.

In the embodiment of FIGS. 2a-b, the cross-flow filter 3a is a cylindrical cross-flow filter, which surrounds a cylindrical channel 3i being part of the inner compartment 3e. The circulation inlet 3b of the filtration device 3 is connected to the cylindrical channel 3i at one end thereof and the circulation outlet 3c of the filtration device 3 is connected to the cylindrical channel 3i at the other end thereof.

Furthermore, in the embodiment of FIGS. 2a-b, the cross-flow filter 3a is a wedge wire filter, which comprises wedge wires 3j arranged parallel with a flow direction of material comprising beer through the inner compartment 3e from the circulation inlet 3b to the circulation outlet 3c, which wedge wires 3j comprise planar portions 3k forming the inner surface 3g and tip portions 3l forming said outer surface 3h. The wedge wires may be welded onto a support profile (not shown).

The inner compartment 3e, the outer compartment 3f and the cross-flow filter 3a are arranged such that material comprising beer received in the inner compartment 3e need to pass through the cross-flow filter 3a in order to reach the outer compartment 3f and thus the outlet 3d for filtered material comprising beer.

The flow direction for the recirculation flow in the recirculation loop 4 is described as being counter-clockwise in FIG. 1. However, the flow direction for the recirculation flow may alternatively be reversed, e.g. during certain process steps.

During use of the extraction system 1 of FIG. 1, hop pellets are introduced into the process vessel 2 via the inlet 2a. Thereafter it is ensured that the outlet 3d for filtered material comprising beer of the filtration device 3 is closed and material comprising beer is introduced into the recirculation loop 4 (i.e. the second circulation conduit 4b) from the first storage vessel 6 via the feed conduit 8 and feed inlet 4c by means of the feed pump 7. The material comprising beer introduced into the recirculation loop 4 may consist of beer. The introduction of the material comprising beer is performed until the recirculation loop 4 is filled up completely, i.e. such that all parts of the recirculation loop 4 is filled up, also including the process vessel 2.

Thereafter the feed inlet 4c is closed and the outlet 3d for filtered material comprising beer is kept closed and material comprising beer introduced into the recirculation loop 4 is circulated in the recirculation loop 4. The circulation is performed by means of the recirculation pump 5. The circulation is performed so as to obtain disaggregation of hop pellets in the process vessel 2, provide the circulating material comprising beer with solid components/particles of hop pellets and thus facilitate extraction of soluble flavoring components from the hop pellets. During the circulation, soluble flavoring components of the hop pellets will be extracted into the beer and insoluble solid components of the hop pellets will also be included in the material comprising beer.

The aim of the disaggregation may be to obtain a certain size of the disaggregated solid parts of the hop pellets and the disaggregation may be monitored in any suitable way.

After finished disaggregation of the hop pellets, the feed inlet 4c and the outlet 3d for filtered material comprising beer of the filtration device 3 are opened, material comprising beer is feed into the recirculation loop 4 from the first storage vessel 6 via the feed conduit 8 and feed inlet 4c by means of the feed pump 7 and material comprising beer is circulated in the recirculation loop 4. The circulation of material comprising beer in the recirculation loop 4 is performed by means of the recirculation pump 5.

Accordingly, after finished disaggregation of the hop pellets, untreated material comprising beer is fed into the recirculation loop 4 and further to the circulation inlet 2b of the process vessel 2 since the feed inlet 4c is connected to the circulation inlet 2b of the process vessel 2 via the second circulation conduit 4b. In addition, material comprising beer discharged from the filtration device 3, i.e. unfiltered material comprising beer, is fed to the circulation inlet 2b of the process vessel 2 together with material comprising beer introduced into the recirculation loop via the feed inlet 4c. Thus, the material comprising beer introduced into the process vessel 2 comprises then both material comprising beer introduced into the recirculation loop 4 via the feed inlet 4c and unfiltered material comprising beer discharged from the filtration device 3.

Furthermore, during circulation of material comprising beer in the recirculation loop, soluble flavoring components of the disaggregated hop pellets will be extracted into the beer and insoluble solid components of the hop pellets will also be included in the material comprising beer.

In addition, during circulation of material comprising beer in the recirculation loop, material comprising beer introduced into the cross-flow filtration device 3 is introduced into the inner compartment 3e and the channel 3i via the circulation inlet 3b and guided along the inner surface 3g of the cross-flow filter 3a. Then a part of the material comprising beer is filtered through the cross-flow filter 3a towards the outer compartment 3f and discharged through the outlet 3d for filtered material comprising beer. Thereby the filtered material comprising beer discharged via the outlet 3d for filtered material comprising beer contains no, or an essentially reduced concentration of, solid components of the hop pellets since solid components are retained by the cross-flow filter 3a. The remaining part of the material comprising beer guided along the cross-flow filter 3a, but not penetrated through the cross-flow filter 3a, will then comprise a greater concentration of solid components and is discharged from the filtration device 3 via the circulation outlet 3c of the filtration device 3. Material comprising beer discharged from the filtration device 3 via the outlet 3d for filtered material comprising beer is fed to the second storage vessel 9 via the discharge conduit 10a. Alternatively, discharged material comprising beer may be fed to the first storage vessel 6 via the discharge conduit 10b.

The circulation for disaggregation of hop pellets may performed at a first flow rate and the circulation during the filtration may performed at a second flow rate, wherein the second flow rate is higher than the first flow rate. The increase of the flow rate such that it is higher during the filtration than during the extraction may be performed in order to avoid clogging of the cross-flow filter 3a by solid components/particles of the hop pellets, i.e. in order to obtain a certain velocity of the flow of material comprising beer on the inner surface 3g of the cross-flow filter 3a such that clogging thereof is avoided. Clogging of the cross-flow filter 3a may also be avoided/reduced by regulating the recirculation flow in the recirculation loop 4 and the flow of material comprising beer introduced into the recirculation loop via the feed inlet 4c.

Optionally, the recirculation loop 4 may be made oxygen free by means of $CO_2$ purging before introduction of material comprising beer into the recirculation loop 4. Then $CO_2$ is introduced into the recirculation loop 4 from the $CO_2$ source 11 via the $CO_2$ supply conduit 11a. This is performed after introduction of hop pellets into the process vessel but before introduction of material comprising beer into the recirculation loop 4. When material comprising beer thereafter is introduced into the recirculation loop 4 so as to fill up the recirculation loop with material comprising beer, the $CO_2$ present in the recirculation loop 4 will be vented out during the filling via the $CO_2$ discharge conduit 11b.

The flow direction for the recirculation flow in the recirculation loop 4 is described as being counter-clockwise in FIG. 1. However, the flow direction for the recirculation flow may alternatively be reversed, e.g. during certain process steps.

The material comprising beer introduced into the recirculation loop 4 may be constituted by beer. Then a slurry comprising beer and disaggregated solid components of hop pellets is formed during the circulation in the recirculation loop. Also, during the circulation in the recirculation loop soluble flavouring components are extracted into the beer of the slurry. Solid components of the hop pellets comprised in the slurry may then be retained in the circulating material in the filtration device 3 during the filtration, whereby the material discharged via the outlet 3d of the filtration device 3 may be beer comprising dissolved flavoring components.

Figure 3:
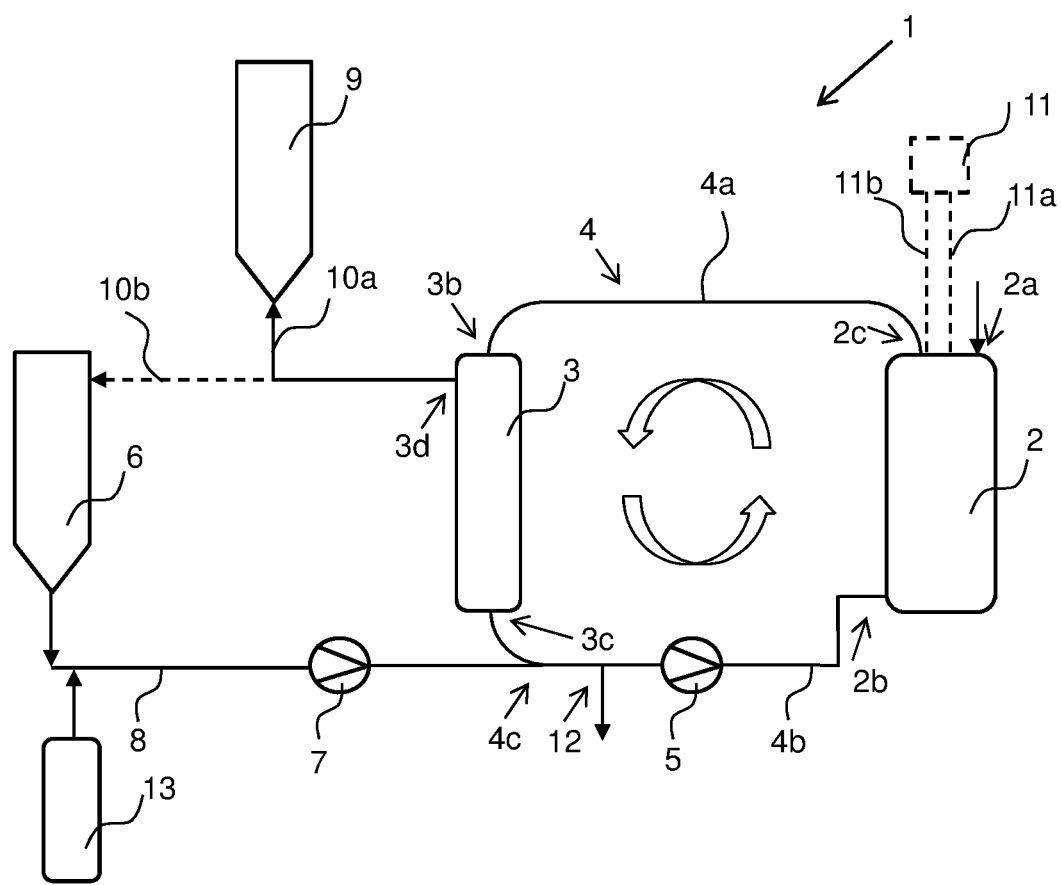
FIG. 3 shows a schematic view of another embodiment of the system for extraction of soluble flavoring components from a solid flavor carrier material into a brewing liquid according to the present disclosure.
Figure 4A:
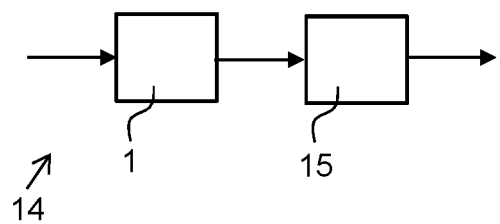
FIGS. 4a-d show schematic views of different embodiments of a brewery arrangement comprising the system of FIG. 1.
Figure 4B:
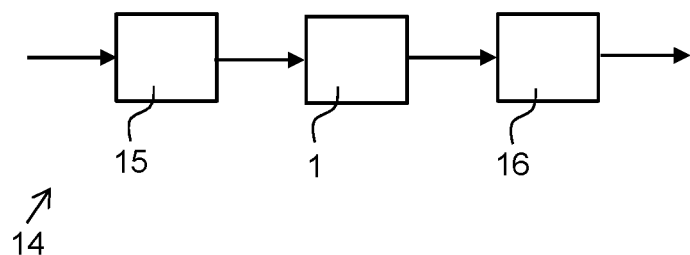
Figure 4C:
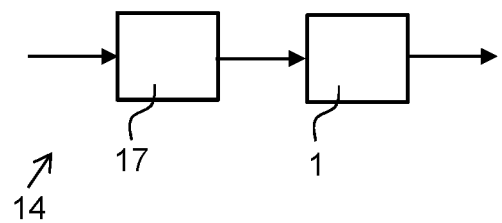
Figure 4D:
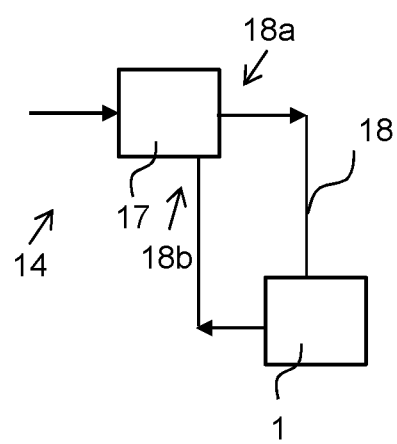

FIG. 3 shows another embodiment of the extraction system 1 according to the present disclosure. The extraction system 1 of FIG. 3 corresponds to the extraction system 1 of FIG. 1, but with the differences that the extraction system 1 of FIG. 3 further comprises a closable drain outlet 12 comprised in the recirculation loop 4 and a third storage vessel 13 arranged to store a second material comprising a second brewing liquid and that the circulation inlet 2b of the process vessel 2 is arranged differently.

The closable drain outlet 12 is positioned between the circulation outlet 3c of the filtration device 3 and the circulation inlet 2b of the process vessel 2. The drain outlet 12 is arranged for drainage of material from the recirculation loop 4. The third storage vessel 13 is connected to the feed inlet 4c via the feed conduit 8.

In the embodiment of FIG. 3, the circulation inlet 2b of the process vessel 2 is arranged such that a tangential flow of material comprising beer is introduced into the process vessel 2 when material comprising beer is pumped in the recirculation loop 4 by means of the recirculation pump 5.

When the system 1 of FIG. 3 is utilized, it is utilized in the same way as described above for the system 1 of FIG. 1 until the circulation of material comprising beer during filtration is finished. However, the drain outlet 12 is kept closed until the circulation of material comprising beer during filtration is finished. Thereafter a second material comprising a second brewing liquid may be introduced into the recirculation loop 4 via the feed inlet 4c instead of the previously utilized material comprising beer, still with the drain outlet 12 closed and the outlet 3d for filtered material of the filtration device 3 open.

The previously utilized material comprising beer is then replaced with another, second, material. For example, the second brewing liquid may be a suitable cleaning liquid for recovery of beer still contained in the recirculation loop 4 and/or for cleaning and recovery of the hop pellets comprised in the recirculation loop 4. The second brewing liquid may be brewing water, such as deaerated water.

By introducing and circulating the second brewing liquid material in the recirculation loop in accordance with the above, recovery of beer (together with the second brewing liquid) may be obtained in a first substep through the outlet 3d of the filtration device 3. The first substep may be succeeded by a second substep for recovery of hop pellets remaining in the recirculation loop 4 after the first substep. The second substep then includes opening the drain outlet 12 and draining material still comprised in the recirculation loop 4 after the first substep, whereby the outlet 3d for filtered material and the feed inlet 4c are closed. A slurry of material remaining in the recirculation loop, e.g. a slurry of second material, hop particles and possibly material comprising beer, is then drained via the drain outlet 12 during the second substep.

FIGS. 4a-d show schematic views of different embodiments of a brewery arrangement 14 comprising the extraction system 1 of FIG. 1. In FIGS. 4a-d the extraction system 1 is only shown highly schematically. The brewery arrangement 14 of FIG. 4a comprises a whirlpool 15, wherein the extraction system 1 is positioned upstream the whirlpool 15. The brewery arrangement of FIG. 4b comprises a whirlpool 15 and a wort cooler 16, wherein the extraction system 1 is positioned between the whirlpool 15 and the wort cooler 16. The brewery arrangement 14 of FIG. 4c comprises a fermentation tank 17, wherein the extraction system 1 is positioned downstream the fermentation tank 17. The brewery arrangement 14 of FIG. 4d comprises a fermentation tank 17 and a recirculation loop 18 having an inlet 18a and an outlet 18b connected to the fermentation tank 18. The extraction system 1 is positioned in the recirculation loop 18 in this brewery arrangement 14. The brewery arrangements 14 of FIGS. 4a-d may further comprise any other devices of a brewery arrangement.

While the invention has been described in connection with various exemplary embodiments, it is to be understood that the invention is not to be limited to the disclosed exemplary embodiments, on the contrary, it is intended to cover various modifications and equivalent arrangements within the appended claims. Furthermore, it should be recognized that any disclosed form or embodiment of the invention may be incorporated in any other disclosed or described or suggested form or embodiment as a general matter of design choice. It is the intention, therefor, to be limited only as indicated by the scope of the claims.

The invention claimed is:

1. A system for extraction of soluble flavoring components from a solid flavor carrier material into a brewing liquid, wherein the system comprises:
   a process vessel arranged to receive the solid flavor carrier material and to receive and discharge brewing liquid material comprising the brewing liquid, wherein said process vessel comprises an inlet for the solid flavor carrier material, a circulation inlet for the brewing liquid material comprising the brewing liquid and a circulation outlet for the brewing liquid material comprising the brewing liquid, and
   a filtration device for separation of solid components from the brewing liquid material comprising the brewing liquid, wherein said filtration device is a cross-flow filtration device comprising at least one cross-flow filter within the cross-flow filtration device, a circulation inlet for the brewing liquid material comprising the brewing liquid, a circulation outlet for unfiltered brewing liquid material comprising the brewing liquid and a closable outlet for filtered brewing liquid material comprising the brewing liquid;
   wherein the process vessel and the filtration device are comprised in a recirculation loop for circulation of the brewing liquid material comprising the brewing liquid,
   wherein the circulation outlet of the process vessel is connected to the circulation inlet of the filtration device in the recirculation loop,
   wherein the circulation outlet of the filtration device is connected to the circulation inlet of the process vessel in the recirculation loop,
   wherein the system further comprises a recirculation pump for generating a flow of the brewing liquid material comprising the brewing liquid in the recirculation loop,
   wherein the recirculation loop further comprises a closable feed inlet for introduction of the brewing liquid material comprising the brewing liquid into the recirculation loop, said closable feed inlet being connected to the circulation inlet of the process vessel, and
   wherein the recirculation loop optionally further comprises a closable drain outlet.

2. The system according to claim 1, wherein said cross-flow filtration device is a filtrate-in-to-out filtration device, wherein the filtration device comprises an inner compartment arranged to receive material comprising brewing liquid via the circulation inlet of the filtration device and to discharge the unfiltered brewing liquid material comprising the brewing liquid via the circulation outlet of the filtration device, wherein the filtration device comprises an outer compartment arranged to receive the filtered brewing liquid material comprising the brewing liquid and to discharge the filtered brewing liquid material comprising the brewing liquid via the closable outlet for the filtered brewing liquid material comprising the brewing liquid, wherein each cross-flow filter comprised in the filtration device has an inner surface and an outer surface, and wherein the inner surface of each cross-flow filter is arranged in contact with said inner compartment and wherein the outer surface of each cross-flow filter is arranged in contact with said outer compartment.

3. The system according to claim 2, wherein at least one of said at least one cross-flow filter is a cylindrical cross-flow filter, wherein the cylindrical cross-flow filter surrounds a channel being part of said inner compartment.

4. The system according to claim 2, wherein at least one of said at least one cross-flow filter is a wedge wire filter.

5. The system according to claim 4, wherein the wedge wire filter comprises wedge wires arranged parallel with a flow direction of the brewing liquid material comprising the brewing liquid through the inner compartment from the circulation inlet to the circulation outlet, the wedge wires comprising planar portions forming said inner surface.

6. The system according to claim 1, wherein said cross-flow filter comprises filter openings having a size of ≤200 µm.

7. The system according to claim 1, wherein the circulation inlet of the process vessel is arranged such that a tangential flow of the brewing liquid material comprising the brewing liquid is introduced into the process vessel when the brewing liquid material comprising the brewing liquid is pumped in the recirculation loop by the recirculation pump.

8. A brewery arrangement comprising the system according to claim 1 and at least one device selected from the group of a whirlpool, a wort cooler and a fermentation tank.

9. The brewery arrangement according to claim 8, wherein the brewery arrangement comprises the whirlpool, wherein the system is positioned upstream of said whirlpool.

10. The brewery arrangement according to claim 8, wherein the brewery arrangement comprises the whirlpool and the wort cooler, wherein the system is positioned between the whirlpool and the wort cooler.

11. The brewery arrangement according to claim 8, wherein the brewery arrangement comprises the fermentation tank, wherein the system is positioned downstream of the fermentation tank or is positioned in a recirculation loop having an inlet and an outlet connected to the fermentation tank.

12. A method for extraction of soluble flavoring components from a solid flavor carrier material into a brewing liquid, the method comprising:
   a) providing the system according to claim 1;
   b) introducing the solid flavor carrier material into said process vessel via said inlet for the solid flavor carrier material;
   c) introducing the brewing liquid material comprising the brewing liquid into the recirculation loop via the closable feed inlet, with the closable outlet for filtered brewing liquid material comprising the brewing liquid of the filtration device and the optional closable drain outlet closed, so as to fill up the recirculation loop with the brewing liquid material comprising the brewing liquid;
   d) circulating the brewing liquid material comprising the brewing liquid in the recirculation loop, with the closable feed inlet, the closable outlet for the filtered brewing liquid material comprising the brewing liquid of the filtration device and the optional closable drain outlet closed, so as to disaggregate the solid flavor carrier material and provide the circulating brewing liquid material comprising the brewing liquid with solid components of the solid flavor carrier material, and
   e) after disaggregation of the solid flavor carrier material, opening the closable feed inlet and the closable outlet for the filtered brewing liquid material comprising the brewing liquid of the filtration device, feeding the brewing liquid material comprising the brewing liquid into the recirculation loop via the closable feed inlet, and circulating the brewing liquid material comprising the brewing liquid in the recirculation loop.

13. The method according to claim 12, wherein the circulation of step d) is performed at a first flow rate and the circulation of step e) is performed at a second flow rate, wherein the second flow rate is higher than the first flow rate.

14. The method according to claim 12, wherein the brewing liquid is beer or wort and wherein the solid flavor carrier material comprises a solid hop material, such as hop pellets.

15. The method according to claim 12, wherein the optional closable drain outlet is kept closed during steps b)-e) of the method and wherein the method further comprises the step of:
   f) introducing a second material comprising a second brewing liquid into the recirculation loop via the closable feed inlet and circulating the second material in the recirculation loop, with the outlet for the filtered brewing liquid material comprising the brewing liquid of the filtration device-open and the optional closable drain outlet of the recirculation loop closed, wherein the second material is different from the brewing liquid material comprising the brewing liquid utilized in steps c)-e) of the method.

16. The method according to claim 15, wherein the recirculation loop of the system provided in step a) of the method comprises the closable drain outlet, wherein the closable drain outlet is kept closed during steps b)-f) of the method and wherein the method further comprises the step of:
   g) opening the closable drain outlet and draining the brewing liquid material comprising the brewing liquid from the recirculation loop via the closable drain outlet with the outlet for the filtered brewing liquid material comprising the brewing liquid of the filtration device and the closable feed inlet closed.

17. The method according to claim 15, wherein the second brewing liquid is brewing water.

* * * * *